US010155208B2

United States Patent
Lin et al.

(10) Patent No.: US 10,155,208 B2
(45) Date of Patent: Dec. 18, 2018

(54) LIQUID MIXING SYSTEM FOR SEMICONDUCTOR FABRICATION

(71) Applicant: TAIWAN SEMICONDUCTOR MANUFACTURING CO., LTD., Hsinchu (TW)

(72) Inventors: An-Chu Lin, New Taipei (TW); Ting-Wen Chen, Hsinchu (TW); Tien-Tze Hsu, Hsinchu (TW); Feng-An Yang, Hsinchu (TW); Yuan-Jian Liao, Nantou (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 426 days.

(21) Appl. No.: 14/502,720

(22) Filed: Sep. 30, 2014

(65) Prior Publication Data

US 2016/0089646 A1    Mar. 31, 2016

(51) Int. Cl.
| | |
|---|---|
| *B01F 15/00* | (2006.01) |
| *G01F 19/00* | (2006.01) |
| *B01F 5/10* | (2006.01) |
| *B01F 15/02* | (2006.01) |
| *B01F 15/04* | (2006.01) |

(52) U.S. Cl.
CPC .......... *B01F 15/00344* (2013.01); *B01F 5/10* (2013.01); *B01F 15/00259* (2013.01); *B01F 15/0216* (2013.01); *B01F 15/0454* (2013.01); *G01F 19/00* (2013.01); *B01F 2015/0221* (2013.01); *Y10T 137/7303* (2015.04); *Y10T 137/87652* (2015.04)

(58) Field of Classification Search
CPC ................ B01F 15/10; B01F 15/00344; B01F 15/00259; B01F 15/0454; B01F 2015/0221; G01F 19/00; F04B 13/00; F04B 49/16
USPC ...................... 137/391, 896; 366/152.6, 136; 156/345.15; 222/145.5–145.6; 417/274, 417/545
See application file for complete search history.

(56) References Cited

U.S. PATENT DOCUMENTS

| | | | | |
|---|---|---|---|---|
| 1,716,504 | A * | 6/1929 | Pierce | F16N 3/12 222/387 |
| 3,161,144 | A * | 12/1964 | Hugentobler | B22D 17/30 417/138 |
| 3,786,966 | A * | 1/1974 | Behunin | E04G 21/20 222/387 |
| 3,877,682 | A * | 4/1975 | Moss | B01F 15/0441 222/145.1 |

(Continued)

FOREIGN PATENT DOCUMENTS

| | | | |
|---|---|---|---|
| TW | I382465 B | 1/2013 | |
| WO | WO 2013091992 A1 * | 6/2013 | .......... B01F 15/0462 |

*Primary Examiner* — Craig J Price
(74) *Attorney, Agent, or Firm* — McDermott Will & Emery LLP

(57) ABSTRACT

A liquid measuring beaker is suitable for measuring an amount of a liquid required in a liquid mixing process. The liquid measuring beaker includes a shell and an adjusting partition. The shell defines a reservoir having a volumetric capacity, in which the shell has a first opening passing through a bottom of the shell. The adjusting partition is vertically movable in the reservoir for adjusting the volumetric capacity, in which the adjusting partition has a second opening passing through the adjusting partition.

20 Claims, 4 Drawing Sheets

(56) References Cited

U.S. PATENT DOCUMENTS

| | | | | |
|---|---|---|---|---|
| 4,012,173 A * | 3/1977 | Everson, Jr. | .......... | F03B 13/187 417/259 |
| 4,253,501 A * | 3/1981 | Ogle | ............ | A61J 1/2096 128/DIG. 12 |
| 4,279,360 A * | 7/1981 | Hauser | ............ | B29C 31/06 222/1 |
| 4,741,623 A * | 5/1988 | Haeuser | ............ | B01F 15/0237 222/318 |
| 5,873,705 A * | 2/1999 | Chen | ............ | F04B 25/02 417/259 |
| 6,348,124 B1 * | 2/2002 | Garbett | ............ | G05D 11/132 156/345.12 |
| 6,358,125 B2 * | 3/2002 | Kawashima | ............ | B01F 3/088 210/416.1 |
| 6,544,109 B1 * | 4/2003 | Moore | ............ | B24B 57/02 451/285 |
| 6,570,524 B1 * | 5/2003 | Mullaly | ............ | G08C 23/04 340/12.22 |
| 6,659,848 B1 * | 12/2003 | Craig | ............ | B24B 57/02 451/446 |
| 6,789,699 B2 * | 9/2004 | Clark | ............ | B01F 15/0462 222/1 |
| 6,802,762 B2 * | 10/2004 | Tanaka | ............ | B24B 57/02 451/28 |
| 6,955,764 B2 * | 10/2005 | Kobayashi | ............ | B01F 3/088 156/345.15 |
| 7,225,946 B2 * | 6/2007 | Gardos | ............ | F04B 11/0058 222/1 |
| 7,335,003 B2 * | 2/2008 | Kingsford | ............ | F04B 9/02 417/417 |
| 7,743,783 B2 * | 6/2010 | Edwards | ............ | B01F 3/088 137/119.1 |
| 7,850,431 B2 * | 12/2010 | Gonnella | ............ | F04B 1/08 417/2 |
| 7,878,765 B2 * | 2/2011 | Gonnella | ............ | F04B 13/00 417/2 |
| 7,897,196 B2 * | 3/2011 | Cedrone | ............ | F04B 13/00 118/300 |
| 8,025,486 B2 * | 9/2011 | Gonnella | ............ | F04B 7/0076 137/884 |
| 8,029,247 B2 * | 10/2011 | Cedrone | ............ | F04B 13/00 222/61 |
| 8,083,498 B2 * | 12/2011 | Gonnella | ............ | F04B 25/00 222/63 |
| 8,087,429 B2 * | 1/2012 | Cedrone | ............ | F04B 13/00 137/884 |
| 8,172,546 B2 * | 5/2012 | Cedrone | ............ | F04B 7/0076 137/884 |
| 8,191,733 B2 * | 6/2012 | Seppanen | ............ | B44D 3/08 222/1 |
| 8,292,598 B2 * | 10/2012 | Laverdiere | ............ | F04B 13/00 222/63 |
| 8,297,830 B2 * | 10/2012 | Tseng | ............ | B24B 37/04 366/136 |
| 8,517,802 B2 * | 8/2013 | Tseng | ............ | B24B 37/04 366/136 |
| 8,870,548 B2 * | 10/2014 | Cedrone | ............ | F04B 13/00 222/63 |
| 9,278,367 B2 * | 3/2016 | Cooper | ............ | B05B 12/004 |
| 2002/0179224 A1 * | 12/2002 | Brynolf | ............ | C08J 7/12 156/82 |
| 2003/0010792 A1 * | 1/2003 | Forshey | ............ | B01F 15/0266 222/56 |
| 2014/0261824 A1 * | 9/2014 | Byers | ............ | B24B 57/02 137/896 |
| 2014/0326322 A1 * | 11/2014 | Schutze | ............ | B01F 15/0458 137/7 |
| 2015/0114480 A1 * | 4/2015 | Hertel | ............ | F04B 13/00 137/14 |
| 2015/0117135 A1 * | 4/2015 | Chen | ............ | B24B 37/04 366/142 |

* cited by examiner

LIQUID MIXING SYSTEM FOR SEMICONDUCTOR FABRICATION

BACKGROUND

Semiconductor electronic devices are formed by stacking multiple layers of materials on a semiconductor substrate, in which the material layers include components and/or connections. In the fabrication of each semiconductor electronic device, the components and/or connections are formed using various patterning processes and various deposition processes, and the patterning processes and the deposition processes may be performed using various liquids such as chemical liquids and slurries. Typically, each of the patterning processes and the deposition processes may need some different chemical liquids or slurries, so that a liquid mixing procedure may be needed before each of the patterning processes and the deposition processes is performed.

In general, in the liquid mixing procedure, a load cell is used to measure liquid-mixing recipes. However, while semiconductor manufacturing processes are rapidly developed, more accurate liquid mixing processes are desired.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
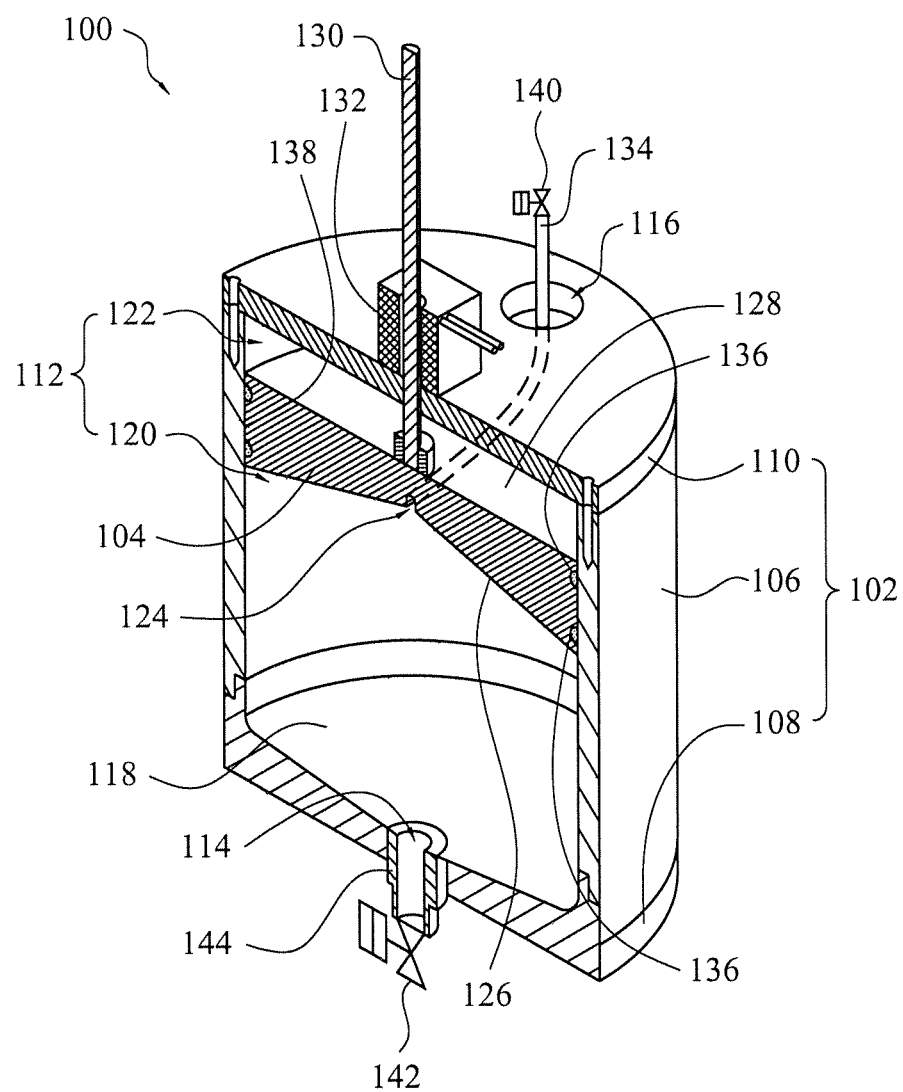
FIG. 1A is a schematic partial diagram of a liquid measuring beaker in accordance with various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Terms used herein are only used to describe the specific embodiments, which are not used to limit the claims appended herewith. For example, unless limited otherwise, the term "one" or "the" of the single form may also represent the plural form. The terms such as "first" and "second" are used for describing various devices, areas and layers, etc., though such terms are only used for distinguishing one device, one area or one layer from another device, another area or another layer. Therefore, the first area can also be referred to as the second area without departing from the spirit of the claimed subject matter, and the others are deduced by analogy. In addition, the present disclosure may repeat reference numerals and/or letters in the various examples. This repetition is for the purpose of simplicity and clarity and does not in itself dictate a relationship between the various embodiments and/or configurations discussed. As used herein, the term "and/or" includes any and all combinations of one or more of the associated listed items.

In a liquid mixing process using a load cell mode, various liquid pipes are connected to a mixing tank to deliver and mix various liquids into the mixing tank, a pump is configured to pump the mixed liquid in the mixing tank for re-circulation, and a load cell is disposed beneath the mixing tank for measuring weight of each liquid. However, the liquid pipes are connected to the mixing tank, so that piping stress of the liquid pipes is generated and exerted on the mixing tank, thereby decreasing measuring accuracy of the load cell. In addition, the pump vibrates while being operated, so that the measuring accuracy of the load cell is further decreased. In the load cell mode, the liquids have to be loaded into the mixing tank for the load cell to measure the weight of each liquid, thereby narrowing a process window of the liquid mixing process.

Embodiments of the present disclosure are directed to providing a liquid measuring beaker, a liquid supplying system and a liquid mixing apparatus in a liquid mixing system for semiconductor fabrication, in which the liquid measuring beaker includes an adjusting partition being vertically movable in a reservoir of a shell for adjusting a volumetric capacity of the reservoir, so that an internal containing volume of the liquid measuring beaker is adjustable. Furthermore, the liquid is injected into a containing space defined by the adjusting partition and the shell through a lower opening disposed in a bottom of the shell, and gas and a superfluous portion of the liquid are drained out through an upper opening disposed in a top of the adjusting partition, so that the containing space can be fully filled up. Thus, the liquid measuring beaker can measure and deliver an amount of a liquid required in a liquid mixing process, so that mixing precision of the liquid mixing process is improved, thereby enhancing a process capability index (Cpk). In addition, the superfluous portion of the liquid is circulated to a supplying source of the liquid, so that the superfluous portion of the liquid can be recycled, so as to reduce cost of the process. Moreover, various liquids can be delivered into the mixing tank simultaneously, so that the liquid mixing process has a wide process window.

Figure 1B:
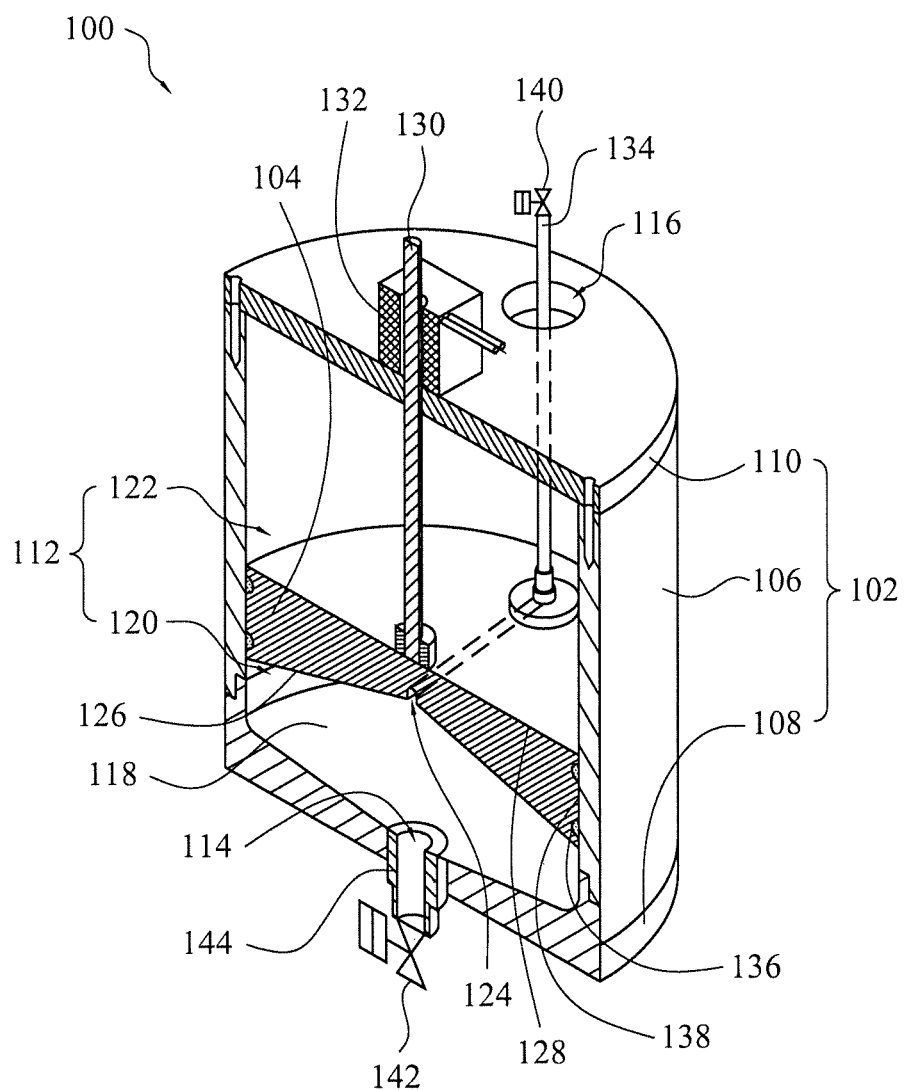
FIG. 1B is a schematic partial diagram of a liquid measuring beaker in accordance with various embodiments.

FIG. 1A and FIG. 1B are schematic partial diagrams of a liquid measuring beaker at two adjusting states in accordance with various embodiments. In some embodiments, a liquid measuring beaker 100 is suitable for measuring an amount of a liquid required in a liquid mixing process, and delivering the liquid to a mixing tank for a mixing procedure. The liquid may be a chemical liquid or a polishing slurry. As shown in FIG. 1A, the liquid measuring beaker 100 includes a shell 102 and an adjusting partition 104. The shell 102 includes a sidewall 106, a bottom 108 and a top 110, in which the bottom 108 and the top 110 are opposite to each other, and the sidewall 106 is connected to and between the bottom 108 and the top 110 so as to define a reservoir 112. The reservoir 112 has a volumetric capacity. In some examples, the top 110 has a through hole 116 for some elements, such as a pipe 134, to pass through the top 110.

The shell 102 has an opening 114 which passes through the bottom 108, and the opening 114 is connected to a pipe 144. The liquid may be introduced into the reservoir 112 through the opening 114. The bottom 108 of the shell 102 has a top surface 118. In some examples, the opening 114 is located in a center of the top surface 118. In certain examples, the top surface 118 may be inclined downward inwardly, i.e. the top surface 118 may be inclined downward from an outer edge toward a center of the top surface 118 for draining off the liquid or a cleaning liquid from the reservoir 112 through the opening 114. In some examples, the liquid is a chemical liquid, such as strong alkalis, strong acids, strong oxidants, strong reductants and organic solvents, and the shell 102 is formed from polytetrafluoroethylene (PTFE). In various examples, the liquid is a slurry for a polishing process, and the shell 102 is formed from polypropylene (PP).

The adjusting partition 104 is disposed and vertically movable in the reservoir 112. The adjusting partition 104 can divide the reservoir 112 into two portions 120 and 122, in which the portion 120 is located under the adjusting partition 104, the portion 122 is located above the adjusting partition 104, and the portions 120 and 122 are separated from each other. The portion 120 of the reservoir 112 is used for containing the liquid to be mixed. The vertically movement of the adjusting partition 104 can adjust the volumetric capacity of the portion 120 of the reservoir 112. As shown in FIG. 1A, when the adjusting partition 104 is vertically moved upwardly, the portion 120 has a larger volumetric capacity. As shown in FIG. 1B, when the adjusting partition 104 is vertically moved downwardly, the portion 120 has a smaller volumetric capacity.

The adjusting partition 104 has an opening 124 passing through the adjusting partition 104. The gas in the portion 120 and the surplus liquid are drained out of the portion 120 through the opening 124. The adjusting partition 104 has a bottom surface 126 and a top surface 128 on opposite sides of the adjusting partition 104. In some examples, the opening 124 is located in a center of the bottom surface 126. In certain examples, the bottom surface 126 may be inclined upward inwardly, i.e. the bottom surface 126 may be inclined upward from an outer edge toward a center of the bottom surface 126 for draining off the gas in the portion 120 through the opening 124 with the pushing of the introducing liquid. In some examples, the liquid is a chemical liquid, such as strong alkalis, strong acids, strong oxidants, strong reductants and organic solvents, and the adjusting partition 104 is formed from PTFE. In various examples, the liquid is a slurry for a polishing process, and the adjusting partition 104 is formed from PP.

In some examples, as shown in FIG. 1A, the liquid measuring beaker 100 includes at least one sealing member, such as two sealing rings 136. The sealing rings 136 are disposed between the sidewall 106 of the shell 102 and an outer side surface 138 of the adjusting partition 104 and are embedded into the outer side surface 138 of the adjusting partition 104. The sealing rings 136 can seal any possible gap between the sidewall 106 and the outer side surface 138 of the adjusting partition 104 for preventing the liquid within the portion 120 from leaking out.

In various examples, the liquid measuring beaker 100 further includes an adjusting device which includes a screw 130 and a motor 132, for example. As shown in FIG. 1A and FIG. 1B, the screw 130 is connected to the adjusting partition 104, and the motor 132 is connected to the screw 130 for driving the screw 130 to vertically move the adjusting partition 104. In certain examples, the screw 130 is connected to a center of the top surface 128 of the adjusting partition 104 for steadily driving the adjusting partition 104.

Two valves 140 and 142 may be respectively disposed in the pipes 134 and 144, and the volume of the pipe 134 from the opening 124 to the valve 140 and that of the pipe 144 from the opening 114 to the valve 142 are measured. Because the volume of the pipe 134 from the opening 124 to the valve 140 and that of the pipe 144 from the opening 114 to the valve 142 are known, and the volume of the portion 120 of the reservoir 112 is adjusted using the adjusting partition 104 according to the requirement of the liquid mixing process and then keeps constant, the liquid measuring beaker 100 can supply the liquid with a constant volume to the mixing tank. In addition, the liquid is injected into the portion 120 defined by the adjusting partition 104 and the sidewall 106 and the bottom 108 of the shell 102 through the opening 114 in the bottom 108, and the gas and the superfluous portion of the liquid are drained out through the opening 124 in the adjusting partition 104, so that the portion 120 of the reservoir 112 can be fully filled up. Thus, the liquid measuring beaker 100 can measure and supply a required amount of the liquid to the mixing tank, so that mixing precision of the liquid mixing process is improved, thereby improving a process capability index.

Figure 2:
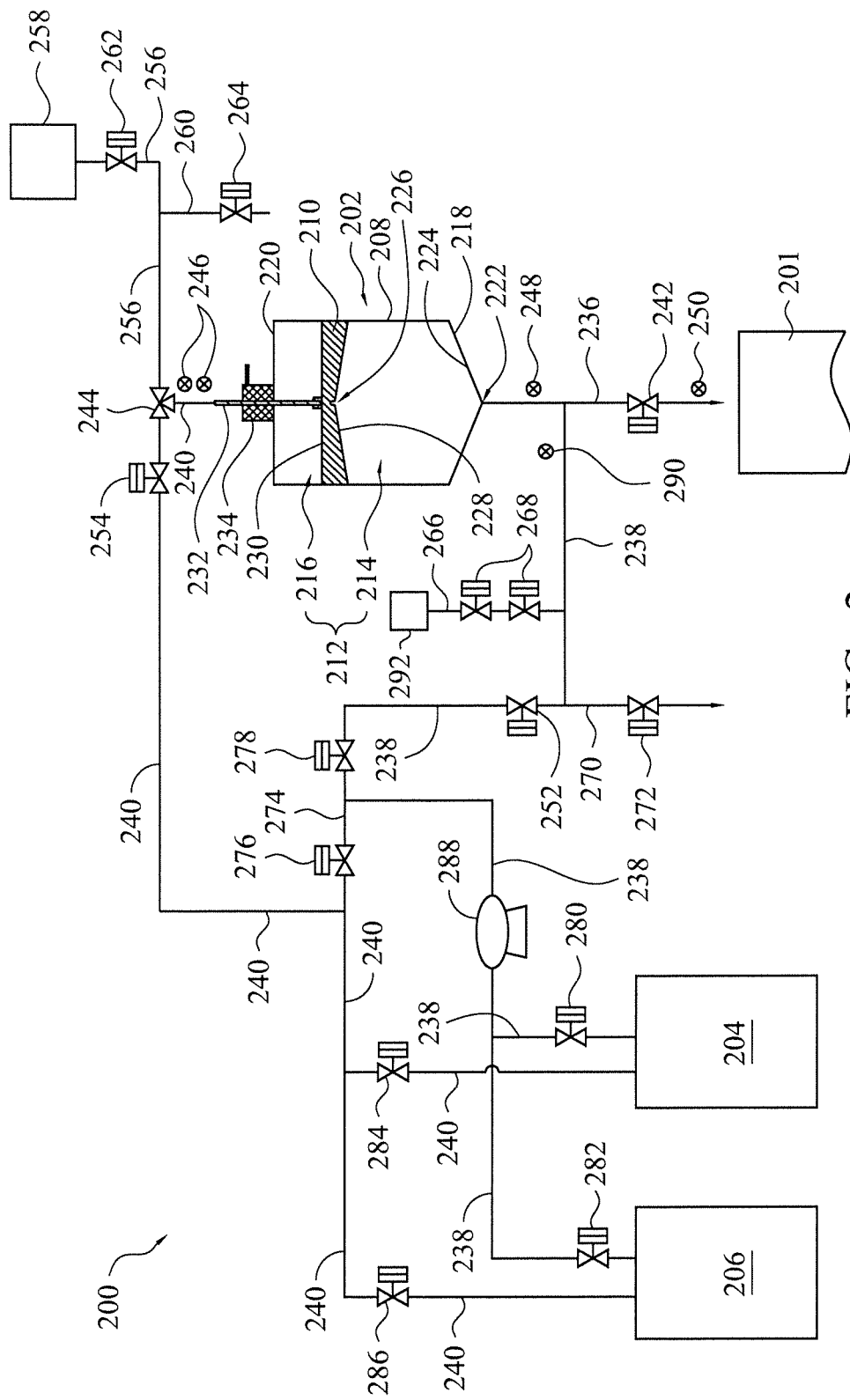
FIG. 2 is a schematic diagram showing a liquid supplying system in accordance with various embodiments.

FIG. 2 is a schematic diagram showing a liquid supplying system in accordance with various embodiments. In some embodiments, a liquid supplying system 200 is suitable for supplying a required amount of a liquid to a mixing tank 201 for a mixing procedure. The liquid may be a chemical liquid or a polishing slurry. As shown in FIG. 2, the liquid supplying system 200 includes a liquid measuring beaker 202 and a liquid supplying source 204. In some examples, the liquid supplying system 200 further includes a liquid supplying source 206 as a spare supplying source.

The liquid measuring beaker 202 is configured to measure the required amount of the liquid and to supply the required amount of the liquid to the mixing tank 201. In various examples, the liquid measuring beaker 202 is the same as the liquid measuring beaker 100 shown in FIG. 1A. The liquid measuring beaker 202 includes a shell 208 and an adjusting partition 210. The shell 208 includes a bottom 218 and a top 220 opposite to each other, and the shell 208 defines a reservoir 212 between the bottom 218 and the top 220. The reservoir 212 has a volumetric capacity.

The shell 208 has an opening 222 passing through the bottom 218. The liquid may be introduced into the reservoir 212 through the opening 222. The bottom 218 of the shell 208 has a top surface 224. In some examples, the opening 222 is located in a center of the top surface 224, and the top surface 224 is inclined downward inwardly, so that the liquid or a cleaning liquid can be drained off from the reservoir 212 through the opening 222. In some examples, the liquid is a chemical liquid, and the shell 208 is formed from PTFE. In various examples, the liquid is a slurry for a polishing process, and the shell 208 is formed from PP.

The adjusting partition 210 is disposed and vertically movable in the reservoir 212. The adjusting partition 210 can divide the reservoir 212 into two portions 214 and 216 separated from each other, in which the portion 214 is located under the adjusting partition 210, and the portion 216 is located above the adjusting partition 210. The portion 214 of the reservoir 212 is used for containing the liquid to be mixed. The vertically movement of the adjusting partition 210 can adjust the volumetric capacity of the portion 214 of the reservoir 212.

The adjusting partition 210 has an opening 226 passing through the adjusting partition 210. The gas in the portion 214 and the surplus liquid are drained out of the portion 214 through the opening 226. The adjusting partition 210 has a bottom surface 228 and a top surface 230 opposite to each other. In some examples, the opening 226 is located in a center of the bottom surface 228, and the bottom surface 228 is inclined upward inwardly, so that the gas in the portion 214 is drained off through the opening 226 with the pushing of the introducing liquid. Similar to the liquid measuring beaker 100 shown in FIG. 1A, the liquid measuring beaker 202 may include at least one sealing member, such as the sealing rings 136 of the liquid measuring beaker 100. In some examples, the liquid is a chemical liquid, and the adjusting partition 210 is formed from PTFE. In various examples, the liquid is a slurry for a polishing process, and the adjusting partition 210 is formed from PP.

In various examples, the liquid measuring beaker 202 further includes a screw 232 and a motor 234. As shown in FIG. 2, the screw 232 is connected to the adjusting partition 210, and the motor 234 is connected to the screw 232 for driving the screw 232 to vertically move the adjusting partition 210. In certain examples, the screw 232 is connected to a center of the top surface 230 of the adjusting partition 210 for steadily driving the adjusting partition 210.

Referring to FIG. 2 again, the liquid supplying source 204 is configured to supply and fill up the portion 214 of the reservoir 212 through the opening 222 with the liquid, i.e. the liquid is injected into the portion 214 from the bottom 218 of the shell 208. In some examples, the liquid supplying system 200 further includes pipes 236, 238 and 240, and valves 242 and 244. The pipe 236 is connected between the opening 222 and the mixing tank 201, and communicates with the opening 222 and the mixing tank 201 for communicating the portion 214 and the mixing tank 201. The pipe 238 is connected between the pipe 236 and the liquid supplying sources 204 and 206, and communicates with the pipe 236 and the liquid supplying sources 204 and 206 for communicating the pipe 236 and the liquid supplying sources 204 and 206. The pipe 240 is connected between the opening 226 and the liquid supplying sources 204 and 206, and communicates with the opening 226 and the liquid supplying sources 204 and 206 for communicating the portion 214 and the liquid supplying sources 204 and 206.

The valve 242 is disposed in the pipe 236 adjacent to the opening 222 of the shell 208 for controlling the communication between the portion 214 of the reservoir 212 and the mixing tank 201. The valve 244 is disposed in the pipe 240 adjacent to the opening 226 of the adjusting partition 210 for controlling the communication between the portion 214 of the reservoir 212 and the liquid supplying sources 204 and 206. In certain examples, referring to FIG. 2, except the portion 214 of the reservoir 212, the liquid supplying source 204 is configured to fill up a portion of the pipe 236 between the valve 242 and the opening 222, and a portion of the pipe 240 between the opening 226 and the valve 244.

In certain examples, the liquid supplying system 200 further includes at least one detection sensor, such as two detection sensors 246, disposed in the pipe 240 between the opening 226 and the valve 244. The detection sensors 246 can be used to detect whether the liquid flows through in the portion of the pipe 240 between the opening 226 and the valve 244 or not. In various examples, the liquid supplying system 200 further includes detection sensors 248 and 250 disposed in the pipe 236. The detection sensor 248 is located between the opening 222 and the valve 242 for detecting whether the liquid flows through the portion of the pipe 236 between the opening 222 and the valve 242 or not. The detection sensor 250 is located between the valve 242 and the mixing tank 201 for detecting whether the liquid flows through the portion of the pipe 236 between the valve 242 and the mixing tank 201 or not.

In some examples, the liquid supplying system 200 further includes valves 252 and 254. The valve 252 is disposed in the pipe 238 between the valve 242 and the liquid supplying sources 204 and 206 for controlling the communication between the portion 214 of the reservoir 212 and the liquid supplying sources 204 and 206. The valve 254 is disposed in the pipe 240 between the valve 244 and the liquid supplying sources 204 and 206 for controlling the communication between the valve 244 and the liquid supplying sources 204 and 206. When the liquid is injected into the portion 214 of the reservoir 212 through the pipes 238 and 236 from the liquid supplying sources 204 or 206, the valves 244, 252 and 254 are opened for smooth flowing of the liquid.

In certain examples, the liquid supplying system 200 further includes pipes 256 and 260, and valves 262 and 264. The pipe 256 is connected between the valve 244 and a purge gas source 258, and communicates with the valve 244 and the purge gas source 258 for communicating the valve 244 and the purge gas source 258. The valve 244 can communicate with the opening 226, the valve 254 and the purge gas source 258, so that the valve 244 is typically referred as a three-way valve. In exemplary examples, the purge gas source 258 is a wet nitrogen gas source. The pipe 260 is connected to the pipe 256 and communicates with the pipe 256. The valve 262 is disposed in the pipe 256 between the valve 244 and the purge gas source 258 for controlling the communication between the valve 244 and the purge gas source 258. The valve 264 is disposed in the pipe 260 for controlling the communication of fluid in the pipe 260.

In certain examples, the liquid supplying system 200 further includes pipes 266 and 270, and valves 268 and 272. The pipe 266 is connected to the pipe 238 and a cleaning fluid source 292 and between the valve 252 and opening 222, and communicates with the pipe 238 and the cleaning fluid source 292 for communicating the cleaning fluid source 292 and the pipe 238. In exemplary examples, the cleaning fluid source 292 is a deionized (DI) water source. The pipe 260 is connected to the pipe 238 and communicates with the pipe 238 between the valve 252 and the pipe 266. The liquid supplying system 200 may include at least one valve 268, such as two valves 268, and the valves 268 are disposed in the pipe 266 between the pipe 238 and the cleaning fluid source 292 for controlling the communication between the cleaning fluid source 292 and the pipe 238. The valve 272 is disposed in the pipe 270 for controlling the communication of fluid in the pipe 270. In some exemplary examples, the liquid supplying system 200 further includes detection sensor 290 disposed in the pipe 238 between the opening 222 and the pipe 266. The detection sensors 290 can be used to detect whether the liquid flows through in the portion of the pipe 238 between the pipe 266 and the opening 222 or not.

The liquid supplying system 200 may further include a pump 288 disposed in the pipe 238 between the valve 252 and the liquid supplying sources 204 and 206 to pump the liquid from the liquid supplying source 204 or 206 toward the portion 214 of the reservoir 212. In exemplary examples, the liquid supplying system 200 further includes a pipe 274 connected to the pipes 238 and 240, and communicates with the pipes 238 and 240 for communicating the pipes 238 and 240.

In various examples, a valve 276 may be disposed in the pipe 274 for controlling the communication between the pipes 238 and 240. In addition, a valve 278 may be disposed in the pipe 238 between the pipe 274 and the valve 252 for controlling the communication between the pipe 274 and the valve 252 and between the liquid supplying sources 204 and 206 and the valve 252. Valves 280 and 282 may be disposed in the pipe 238 and respectively between the liquid supplying source 204 and the valve 278 and between the liquid supplying source 206 and the valve 278 for respectively controlling the communication between the liquid supplying source 204 and the valve 278 and between the liquid supplying source 206 and the valve 278. Valves 284 and 286 may be disposed in the pipe 240 and respectively between the liquid supplying source 204 and the valve 276 and between the liquid supplying source 206 and the valve 276 for respectively controlling the communication between the liquid supplying source 204 and the valve 276 and between the liquid supplying source 206 and the valve 276.

Referring to FIG. 2 again, when the liquid supplying system 200 is used to supplying the required amount of the liquid to the mixing tank 201, the volume of the portion 214 of the liquid measuring beaker 202 is firstly adjusted. In some exemplary examples, a programmable logic controller (PLC) is used to control the motor 234 to drive the screw 232, so as to vertically move the adjusting partition 210 to adjust the volume of the portion 214. Next, the liquid is injected into the portion 214 from the liquid supplying source 204 or 206. In the operation of infusing the liquid into the portion 214, the valves 262 and 272 are opened, and the purge gas source 258 supplies purge gas, such as wet nitrogen gas, for a predetermined time, until the detection sensors 248 and 290 do not detect the liquid. Then, the valves 262 and 272 are closed, the valves 244, 252 and 254 are opened, and the liquid is injected into the portion 214 from the liquid supplying source 204 or 206 until the detection sensors 246 detects the liquid flowing through the portion of the pipe 240 between the opening 226 and the valve 244, i.e. the liquid has filled up the portion 214 and overflows the portion 214. After the detection sensors 246 show signals of detecting the liquid for a predetermined time, the valve 252 is closed while the valves 244 and 254 keep open. After the pressure of the liquid within the liquid measuring beaker 202 balances, the valves 244 and 254 are closed. For the time being, the operation of infusing the liquid into the portion 214 is completed.

When the portion 214 has been filled up with the liquid, the liquid can be transferred to the mixing tank 201 from the liquid measuring beaker 202. In the operation of transferring the liquid to the mixing tank 201, the valves 242 and 262 are opened until the detection sensors 248 and 250 do not detect the liquid. When the detection sensors 248 and 250 do not detect the liquid, the operation of transferring the liquid to the mixing tank 201 is finished.

After the liquid is transferred to the mixing tank 201, the liquid measuring beaker 202 needs to be cleaned. The operation of cleaning the liquid measuring beaker 202 may include several cleaning stages. In a first cleaning stage, the valves 268 and 264 are opened, and a cleaning fluid, such as DI water, is supplied by the cleaning fluid source 292 to wash the portion of the pipe 238 between the pipe 266 and 236, the portion of the pipe 236 between the valve 242 and the opening 222, the portion 214 of the reservoir 212, the portion of the pipe 240 between the opening 226 and the valve 244, the portion of the pipe 256 between the valve 244 and the pipe 260 and the pipe 260. The cleaning fluid is then drained out through the valve 264 and the pipe 260. In some exemplary examples, the first cleaning stage is performed using a timer to control the cleaning time.

Next, a second cleaning stage is performed. In the second cleaning stage, the valve 272 is opened while the valves 268 and 264 keep open, and the cleaning fluid source 292 keeps supplying the cleaning fluid to wash the portion of the pipe 266 between the valves 268 and the pipe 238, the portion of the pipe 238 between the pipe 266 and the valve 252 and the pipe 270. The cleaning fluid is then drained out through the valve 272 and the pipe 270. In some exemplary examples, the second cleaning stage is performed using a timer to control the cleaning time. Then, the valves 268 and 264 are closed while the valve 272 keeps open, such that the remnant cleaning fluid flows to the valve 272 and is drained out. Subsequently, the valve 264 is opened again while the valve 272 keeps open. The purge gas source 258 may supply the purge gas with a low flow rate. In certain examples, the purge gas source 258 does not supply the purge gas. The valves 264 and 272 keep open to continuously drain the remnant liquid and cleaning liquid until the detection sensors 248 and 290 do not detect the liquid. In some exemplary examples, the valves 264 and 272 keep open until the detection sensors 248 and 290 do not detect the liquid and the time set by a timer is up.

The liquid supplying system 200 is a closed system, and the surplus liquid flows back to the liquid supplying source 204 or 206 via the pipe 240 for recycling without being contaminated by external gas and/or contaminants. Thus, no liquid supplied in the liquid mixing process is wasted, thereby reducing cost of the process.

Figure 3:
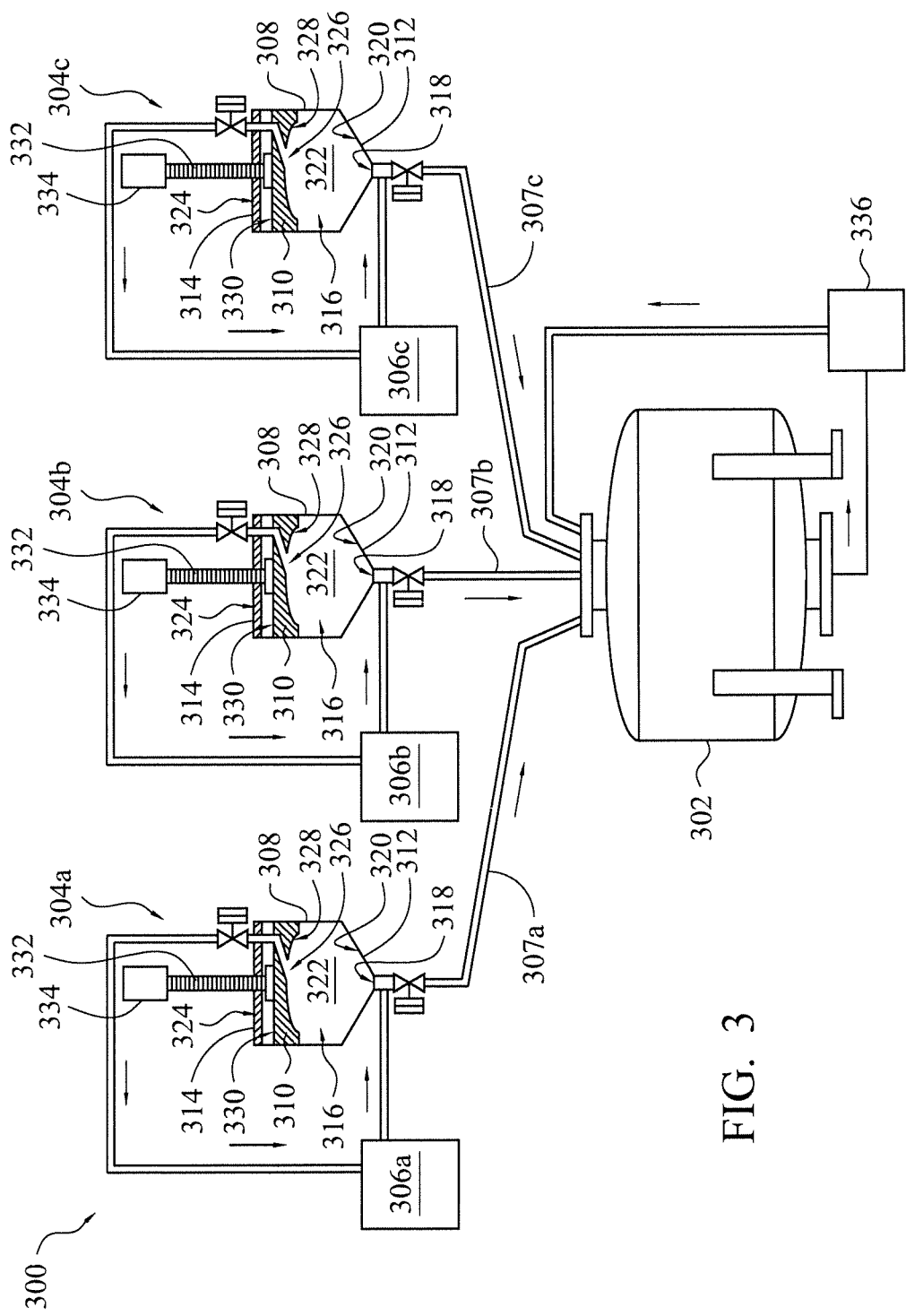
FIG. 3 is a schematic diagram showing a liquid mixing apparatus in accordance with various embodiments.

FIG. 3 is a schematic diagram showing a liquid mixing apparatus in accordance with various embodiments. As shown in FIG. 3, a liquid mixing apparatus 300 includes a mixing tank 302, various liquid measuring beakers and various liquid supplying sources. For example, the liquid mixing apparatus 300 includes three liquid measuring beakers 304a, 304b and 304c, and three liquid supplying sources 306a, 306b and 306c respectively corresponding to the liquid measuring beakers 304a, 304b and 304c.

The liquid measuring beakers 304a, 304b and 304c are connected to and communicate with the mixing tank 302 respectively via pipes 307a, 307b and 307c. Each of the liquid measuring beakers 304a, 304b and 304c is configured to measure an amount of a liquid required in a liquid mixing process and to deliver the amount of the liquid to the mixing tank 302. In various examples, each of the liquid measuring beakers 304a, 304b and 304c is the same as the liquid measuring beaker 100 shown in FIG. 1A. Each of the liquid measuring beakers 304a, 304b and 304c includes a shell 308 and an adjusting partition 310. Each shell 308 includes a bottom 312 and a top 314 opposite to each other, and the shell 308 defines a reservoir 316 between the bottom 312 and the top 314. The reservoir 316 has a volumetric capacity.

Each shell 308 has an opening 318 passing through the bottom 312. The liquid may be introduced into the reservoir 316 through the opening 318. The bottom 312 of each shell 308 has a top surface 320. In some examples, the opening 318 is located in a center of the top surface 320, and the top surface 320 is inclined downward inwardly, so that the liquid or a cleaning liquid can be drained off from the reservoir 316 through the opening 318. In some examples, the liquid is a chemical liquid, and the shells 308 are formed from PTFE. In various examples, the liquid is a slurry for a polishing process, and the shells 308 are formed from PP.

In each of the liquid measuring beakers 304a, 304b and 304c, the adjusting partition 310 is disposed in the reservoir 316 and is vertically movable in the reservoir 316. The adjusting partition 310 can divide the reservoir 316 into two portions 322 and 324 separated from each other, in which the portion 322 is located under the adjusting partition 310, and the portion 324 is located above the adjusting partition 310. The portion 322 of the reservoir 316 is used for containing the liquid to be mixed. The vertically movement of the adjusting partition 310 can adjust the volumetric capacity of the portion 322 of the reservoir 316.

In each of the liquid measuring beakers 304a, 304b and 304c, the adjusting partition 310 has an opening 326 passing through the adjusting partition 310. The gas in the portion 322 and the surplus liquid are drained out of the portion 322 through the opening 326. The adjusting partition 310 has a bottom surface 328 and a top surface 330 opposite to each other. In some examples, the opening 326 is located in a center of the bottom surface 328, and the bottom surface 328 is inclined upward inwardly, so that the gas in the portion 322 is drained off through the opening 326 with the pushing of the introducing liquid. Similar to the liquid measuring beaker 100 shown in FIG. 1A, each liquid measuring beaker 304a, 304b and 304c may include at least one sealing member, such as the sealing rings 136 of the liquid measuring beaker 100. In some examples, the liquid is a chemical liquid, and the adjusting partition 310 is formed from PTFE. In various examples, the liquid is a slurry for a polishing process, and the adjusting partition 310 is formed from PP.

In various examples, each liquid measuring beaker 304a, 304b and 304c further includes a screw 332 and a motor 334. As shown in FIG. 3, the screw 332 is connected to the adjusting partition 310, and the motor 334 is connected to the screw 332 for driving the screw 332 to vertically move the adjusting partition 310. In certain examples, the screw 332 is connected to a center of the top surface 330 of the adjusting partition 310 for steadily driving the adjusting partition 310.

Referring to FIG. 3 again, the liquid supplying sources 306a, 306b and 306c are respectively connected to and communicate with the liquid measuring beakers 304a, 304b and 304c. The liquid supplying sources 306a, 306b and 306c are configured to respectively supply and fill up the portions 322 of the liquid measuring beakers 304a, 304b and 304c through the openings 318 with liquids, i.e. the liquids are respectively injected into the portions 322 from the bottoms 312 of the shells 308. In various examples, the liquids supplied by the liquid supplying sources 306a, 306b and 306c are different from each other.

After the portions 322 of the liquid measuring beakers 304a, 304b and 304c are filled up with the liquids supplied by the liquid supplying sources 306a, 306b and 306c, the liquids within the portions 322 are delivered into the mixing tank 302 respectively through the pipes 307a, 307b and 307c for mixing. In some examples, the liquid mixing apparatus 300 further include a pump 336 communicating with the mixing tank 302 for circulating the mixed liquid in the mixing tank 302.

In the liquid mixing apparatus 300, the required volume of each kind of the liquids is controlled by each of the liquid measuring beakers 304a, 304b and 304c, so that the liquids can be introduced into the mixing tank 302 simultaneously, thereby broadening a process window of the liquid mixing process.

In accordance with an embodiment, the present disclosure discloses a liquid measuring beaker which is suitable for measuring an amount of a liquid required in a liquid mixing process. The liquid measuring beaker includes a shell and an adjusting partition. The shell defines a reservoir having a volumetric capacity, in which the shell has a first opening passing through a bottom of the shell. The adjusting partition is vertically movable in the reservoir for adjusting the volumetric capacity, in which the adjusting partition has a second opening passing through the adjusting partition.

In accordance with another embodiment, the present disclosure discloses a liquid supplying system, which is suitable for supplying a required amount of a liquid to a mixing tank. The liquid supplying system includes a liquid measuring beaker and a liquid supplying source. The liquid measuring beaker is configured to measure and supply the required amount of the liquid to the mixing tank. The liquid measuring beaker includes a shell and an adjusting partition. The shell defines a reservoir having a volumetric capacity, in which the shell has a first opening passing through a bottom of the shell. The adjusting partition is vertically movable in the reservoir for adjusting the volumetric capacity, in which the adjusting partition has a second opening passing through the adjusting partition. The liquid supplying source is configured to supply and fill up a portion of the reservoir under the adjusting partition with the liquid through the first opening.

In accordance with yet another embodiment, the present disclosure discloses a liquid mixing apparatus. The liquid mixing apparatus includes a mixing tank, various liquid measuring beakers and various liquid supplying sources. The liquid measuring beakers communicates with the mixing tank, in which each of the liquid measuring beakers is configured to measure and deliver a liquid to the mixing tank. Each liquid measuring beaker includes a shell and an adjusting partition. The shell defines a reservoir having a volumetric capacity, in which the shell has a first opening passing through a bottom of the shell. The adjusting partition is vertically movable in the reservoir for adjusting the volumetric capacity, in which the adjusting partition has a second opening passing through the adjusting partition. The liquid supplying sources respectively correspond to the liquid measuring beakers, in which each of the liquid supplying sources is configured to supply and fill up a portion of the reservoir under the adjusting partition with the liquid through the first opening.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A liquid measuring beaker suitable for measuring an amount of a liquid required in a liquid mixing process, the liquid measuring beaker comprising:
   a shell defining a reservoir having a volumetric capacity, wherein the shell has a first opening passing through a bottom of the shell;
   an adjusting partition which is vertically movable in the reservoir for adjusting the volumetric capacity, wherein the adjusting partition has a second opening passing through the adjusting partition, and the adjusting partition has a bottom surface; and
   a pipe, wherein one end of the pipe is disposed at the second opening, wherein the bottom surface of the adjusting partition is inclined from an edge of the adjusting partition to the pipe.

2. The liquid measuring beaker of claim 1, wherein the bottom of the shell has a top surface inclined downward inwardly.

3. The liquid measuring beaker of claim 1, wherein the shell has a top having a through hole, and the pipe passes through the through hole.

4. The liquid measuring beaker of claim 1, further comprising:
a screw connected to the adjusting partition; and
a motor connected to the screw for driving the screw to vertically move the adjusting partition.

5. The liquid measuring beaker of claim 4, wherein the screw is connected to a center of a top surface of the adjusting partition.

6. A liquid supplying system suitable for supplying a required amount of a liquid to a mixing tank, the liquid supplying system comprising:
a liquid measuring beaker configured for measuring and supplying the required amount of the liquid to the mixing tank, the liquid measuring beaker comprising:
a shell defining a reservoir having a volumetric capacity, wherein the shell has a first opening passing through a bottom of the shell; and
an adjusting partition which is vertically movable in the reservoir for adjusting the volumetric capacity, wherein the adjusting partition has a second opening passing through the adjusting partition, and the adjusting partition has a bottom surface inclined upward inwardly, and the bottom surface extends from an edge of the adjusting partition towards a center of the adjusting partition;
a liquid supplying source configured to supply and fill up a portion of the reservoir under the adjusting partition with the liquid through the first opening;
a first pipe, wherein one end of the first pipe is disposed at the second opening;
a second pipe, wherein a first end of the second pipe is disposed at the first opening, and a second end of the second pipe is connected to the mixing tank; and
a third pipe, wherein a first end of the third pipe is connected to the first pipe, and a second end of the third pipe is connected to the liquid supplying source.

7. The liquid supplying system of claim 6, further comprising:
a first valve disposed in the second pipe adjacent to the first opening; and
a second valve disposed in the first pipe adjacent to the second opening, wherein the liquid supplying source is configured to fill up said portion of the reservoir, a portion of the second pipe between the first valve and the first opening, and a portion of the first pipe between the second opening and the second valve.

8. The liquid supplying system of claim 7, further comprising a detection sensor disposed in the third pipe between the second opening and the second valve.

9. The liquid supplying system of claim 7, further comprising two detection sensors disposed in the second pipe, wherein one of the detection sensors is located between the first opening and the first valve, and the other of the detection sensors is located between the first valve and the mixing tank.

10. The liquid supplying system of claim 7, further comprising:
a third valve disposed in the third pipe between the first valve and the liquid supplying source; and
a fourth valve disposed in the first pipe between the second valve and the liquid supplying source,
wherein when the liquid is injected into the portion of the reservoir through the third pipe and the second pipe, the second valve, the third valve and the fourth valve are opened.

11. The liquid supplying system of claim 10, further comprising:
a fourth pipe connecting the second valve and a purge gas source;
a fifth pipe connected to the fourth pipe;
a fifth valve disposed in the fourth pipe; and
a sixth valve disposed in the fifth pipe.

12. The liquid supplying system of claim 11, further comprising:
a sixth pipe connected to the third pipe and a cleaning fluid source and between the third valve and the first opening;
a seventh pipe connected to the third pipe between the third valve and the sixth pipe;
a seventh valve disposed in the sixth pipe; and
an eighth valve disposed in the seventh pipe.

13. The liquid supplying system of claim 6, wherein the bottom of the shell has a top surface inclined downward inwardly.

14. The liquid supplying system of claim 6, wherein the shell has a top having a through hole, and the first pipe passes through the through hole.

15. The liquid supplying system of claim 6, wherein the liquid measuring beaker further comprises:
a screw connected to the adjusting partition; and
a motor connected to the screw for driving the screw to vertically move the adjusting partition.

16. A liquid mixing apparatus, comprising:
a mixing tank;
a plurality of liquid measuring beakers connected to the mixing tank, wherein each of the liquid measuring beakers is configured for measuring and delivering a liquid to the mixing tank and comprises:
a shell defining a reservoir having a volumetric capacity, wherein the shell has a first opening passing through a bottom of the shell;
an adjusting partition which is vertically movable in the reservoir for adjusting the volumetric capacity, wherein the adjusting partition has a second opening passing through the adjusting partition, and the adjusting partition has a bottom surface inclined upward inwardly, and the bottom surface extends from an edge of the adjusting partition towards a center of the adjusting partition; and
a pipe, wherein one end of the pipe is disposed at the second opening; and
a plurality of liquid supplying sources respectively corresponding to the liquid measuring beakers, wherein each of the liquid supplying sources is configured to supply and fill up a portion of the reservoir under the adjusting partition with the liquid through the first opening, wherein the pipe is connected to at least one of the liquid supplying sources so that fluid communication is established between the volumetric capacity and said at least one of the liquid supplying sources through the pipe.

17. The liquid mixing apparatus of claim 16, wherein the bottom of the shell of each of the liquid measuring beakers has a top surface inclined downward inwardly.

18. The liquid mixing apparatus of claim 16, wherein each of the liquid measuring beakers further comprises:
a screw connected to the adjusting partition; and a motor connected to the screw for driving the screw to vertically move the adjusting partition.

19. The liquid mixing apparatus of claim 18, wherein the screw of each of the liquid measuring beakers is connected to the center of the adjusting partition.

20. The liquid mixing apparatus of claim 16, wherein the shell of each of the liquid measuring beakers is formed from polypropylene or polytetrafluoroethylene.

\* \* \* \* \*